(12) United States Patent
Imamura

(10) Patent No.: US 7,740,270 B2
(45) Date of Patent: Jun. 22, 2010

(54) CURTAIN AIR BAG APPARATUS

(75) Inventor: Takeshi Imamura, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 12/052,112

(22) Filed: Mar. 20, 2008

(65) Prior Publication Data
US 2009/0001694 A1 Jan. 1, 2009

(30) Foreign Application Priority Data
Jun. 28, 2007 (JP) ............................ 2007-170946

(51) Int. Cl.
*B60R 21/21* (2006.01)
(52) U.S. Cl. .................................. 280/730.2
(58) Field of Classification Search ............... 280/729, 280/730.2, 742, 749
See application file for complete search history.

(56) References Cited

U.S. PATENT DOCUMENTS

| | | | | |
|---|---|---|---|---|
| 5,941,564 A * | 8/1999 | Acker | ....................... | 280/743.2 |
| 6,010,149 A * | 1/2000 | Riedel et al. | ............. | 280/730.2 |
| 6,361,069 B1 * | 3/2002 | Saito et al. | ............... | 280/730.2 |
| 6,460,877 B2 * | 10/2002 | Tanabe et al. | ............... | 280/729 |
| 6,672,612 B2 * | 1/2004 | Sauer et al. | .............. | 280/730.2 |
| 6,932,386 B2 * | 8/2005 | Ikeda et al. | ................. | 280/739 |
| 7,331,602 B2 * | 2/2008 | Ochiai et al. | ............. | 280/730.2 |
| 2004/0007857 A1 * | 1/2004 | Sonnenberg et al. | ...... | 280/730.2 |
| 2004/0056456 A1 * | 3/2004 | Ikeda et al. | .............. | 280/730.2 |
| 2006/0071460 A1 * | 4/2006 | Goto | ....................... | 280/730.2 |

FOREIGN PATENT DOCUMENTS

| | | | |
|---|---|---|---|
| JP | 2004-34766 A | | 2/2004 |
| JP | 2004034766 A | * | 2/2004 |
| WO | WO 2005039938 A1 | * | 5/2005 |

* cited by examiner

*Primary Examiner*—Paul N Dickson
*Assistant Examiner*—Robert A Coker
(74) *Attorney, Agent, or Firm*—Sughrue Mion, PLLC

(57) ABSTRACT

A curtain air bag apparatus for protecting an occupant in a vehicle upon a vehicle collision, has an air bag body inflating and deploying in a curtain-like shape in a side surface of a vehicle interior with a high pressure gas jetted and introduced into the air bag body by an inflator. The air bag body has a main inflation chamber and a sub-inflation chamber which are defined by a partition portion formed by bonding inside surfaces of the air bag body, and a gas flow regulation passage formed as a partly non-bonding portion of the partition portion. The main and sub-inflation chambers are respectively located at an upper side and a lower side of the air bag body and communicate with each other through the gas flow regulation passage.

7 Claims, 9 Drawing Sheets

CURTAIN AIR BAG APPARATUS

BACKGROUND OF THE INVENTION

The present invention relates to a curtain air bag apparatus for protecting an occupant by inflating and deploying an air bag body into a curtain-like shape in a side surface of a vehicle interior with a high pressure gas instantaneously provided and introduced into the air bag body by an inflator upon a vehicle collision.

In recent years, there have been proposed and developed various curtain air bag apparatuses. One such curtain air bag apparatus has been disclosed in Japanese Patent Provisional Publication No. 2004-034766 (hereinafter is referred to as "JP2004-034766"). In JP2004-034766, an occurrence of a rebound phenomenon is avoided by reducing an peak acceleration which the occupant suffers by an air bag body inflated and deployed into a curtain-like shape along a side surface of a vehicle interior, and also the inflated air bag body is prevented from excessively deflating, then a sufficient time for restraining an occupant can be secured.

The air bag apparatus in JP2004-034766 has, as shown in FIG. 9, a front protection area "b", a rear protection area "c", of an air bag body "a", and a sub-inflation part "d" formed between the front and rear protection areas "b and c". Further, a vent hole "e" through which the front protection area "b" and the sub-inflation part "d" communicate, is provided. With this structure, when internal pressures of the front and rear protection areas "b and c" increase due to a load by the inflated air bag body restraining the occupants seated in both front and rear seats in the vehicle interior, a part of high pressure gas in the both protection areas "b and c" flows into the sub-inflation part "d" through the vent hole "e". The internal pressure of the front and rear protection areas "b and c" can be then lowered, and the peak acceleration exerted on the occupant can be reduced. Thus the occurrence of the rebound phenomenon can be avoided and the inflated protection areas "b and c" can be prevented from excessively deflating, and the sufficient time for restraining the occupant can be secured.

SUMMARY OF THE INVENTION

In JP2004-034766, however, the sub-inflation part "d" in the air bag body "a" is formed in a front-rear direction of the vehicle between the front and rear protection areas "b and c". Because of this, for example, in a case where a center pillar "f" of the vehicle is disposed between the front protection area "b" and the sub-inflation part "d", the vent hole "e" or a portion positioned upstream of the vent hole "e" in the front protection area "b" is also positioned close to the center pillar "f".

Further, a front seat is installed in the vehicle interior and its backrest portion (not shown) is normally located side by side with the center pillar "f". A clearance or space between these backrest portion and center pillar "f" is remarkably small, and the air bag body "a" is accommodated in a folded state in a right-left direction of the vehicle and inflates and deploys between such small space. That is, a part of the air bag body "a" which faces the center pillar "f" has to deploy in such small confined space, and this part is apt to become a constriction or shrunken or wrinkle state as compared with other parts. Consequently, this interferes with or hinders the flow of the high pressure gas from the front protection area "b" or the rear protection area "c" into the sub-inflation part "d" via the vent hole "e". As a result, when the internal pressure of the front or rear protection area "b or c" increases due to the load by the inflated air bag body restraining the occupant seated in both front or rear seat in the vehicle interior, although the part of the gas in both the protection areas "b and c" attempts to flow into the sub-inflation part "d" via the vent hole "e", this gas becomes hard to flow into the sub-inflation part "d", and then a function of the sub-inflation part "d" which receives the part of the gas becomes difficult to be achieved.

It is therefore an object of the present invention to provide an curtain air bag apparatus adapted to sufficiently perform the reduction function, by the sub-inflation part, of the peak acceleration exerted on the occupant even if the air bag body is located at the position where the air bag body and the center pillar face with each other.

According to one aspect of the present invention, a curtain air bag apparatus for protecting an occupant in a vehicle upon a vehicle collision, comprises: an air bag body inflating and deploying in a curtain-like shape in a side surface of a vehicle interior with a high pressure gas jetted and introduced into the air bag body by an inflator, the air bag body has; a main inflation chamber and a sub-inflation chamber defined by a partition portion formed in the air bag body, and respectively located at an upper side and a lower side of the air bag body; and a gas flow regulation passage which is formed at the partition portion, and through which the main and sub-inflation chambers communicate with each other.

The other objects and features of this invention will become understood from the following description with reference to the accompanying drawings.

DETAILED DESCRIPTION OF THE INVENTION

Embodiments of the present invention will be explained below with reference to the drawings.

Figure 1:
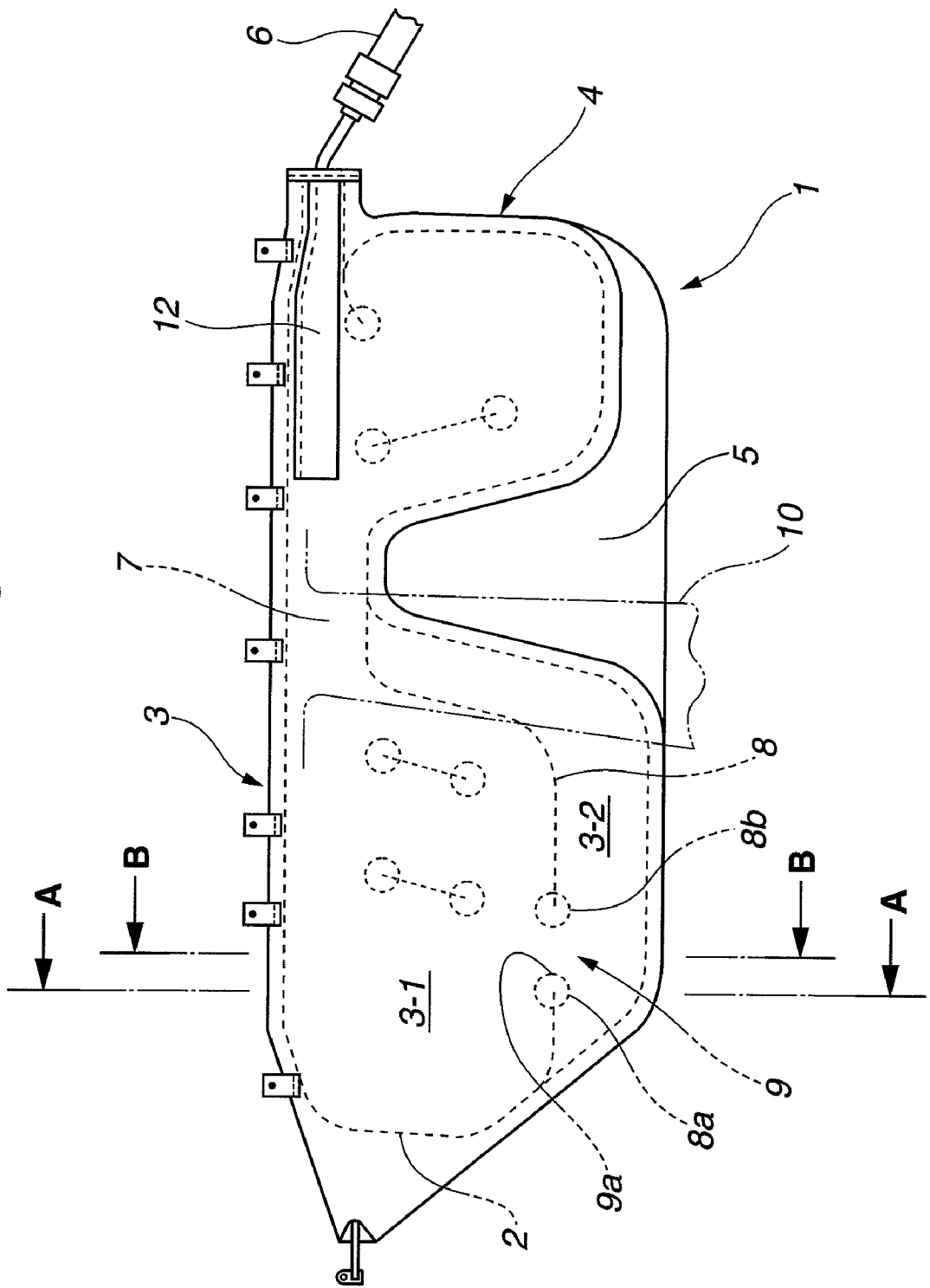
FIG. 1 is a side view showing an inflated and deployed state of a curtain air bag apparatus adopting a first embodiment of the present invention.
Figure 2:
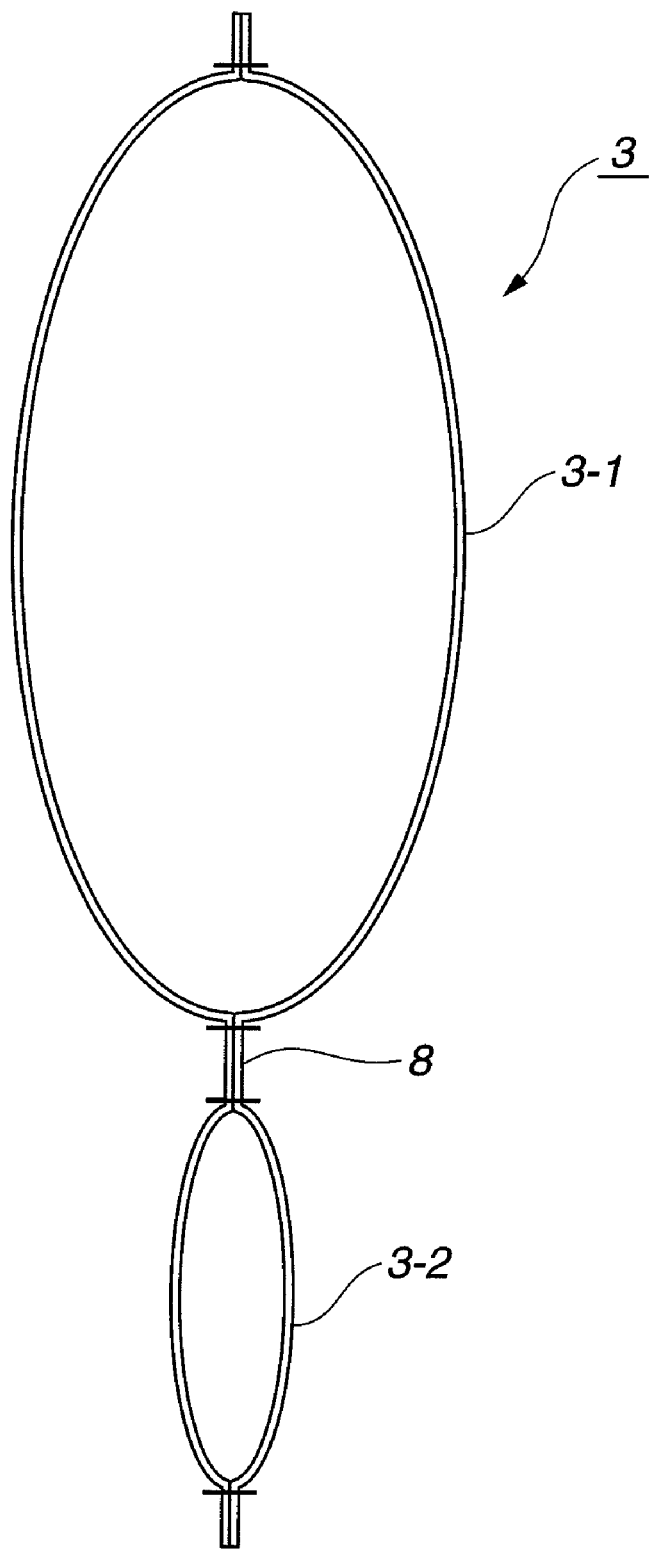
FIG. 2 is a sectional view taken along the plane A-A of FIG. 1.
Figure 3:
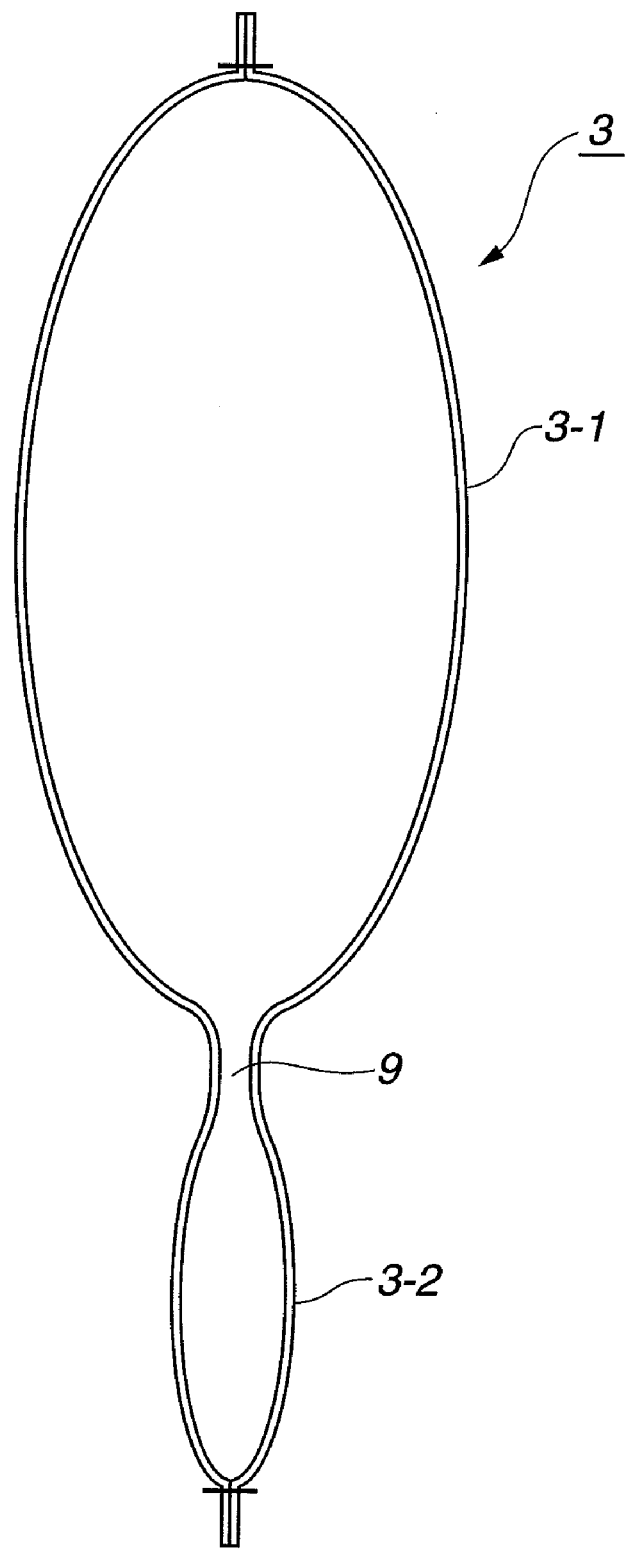
FIG. 3 is a sectional view taken along the plane B-B of FIG. 1.

A first embodiment will be explained with reference to FIGS. 1 to 3. FIG. 1 is a side view showing an inflated and deployed state of a curtain air bag apparatus adopting the first embodiment of the present invention. FIGS. 2 and 3 are sectional views taken along the plane A-A and B-B of FIG. 1 respectively.

As show in FIG. 1, an air bag body 1 has a front protection area 3 and a rear protection area 4. The front protection area 3 and the rear protection area 4 are formed into a pouch shape by uniting or bonding or sewing peripheries of a plurality of base fabric panels (or laminated base fabric), for instance, peripheries of a double base fabric panel, which extend in a longitudinal direction of the vehicle and are a substantially rectangular shape, together by a sewing line 2 with a seal member (not shown) inserted between the peripheries of the double base fabric panel, and then these front and rear protection areas 3 and 4 are defined.

Between the front protection area 3 and the rear protection area 4, a non-inflation part 5 is provided. Further, the front protection area 3 and the rear protection area 4 communicate with each other through a gas introduction passage 7 that introduces a high pressure gas jetted or ejected by an inflator 6 into the front and rear protection areas 3 and 4 via a gas introduction pipe 12 upon the vehicle collision or side collision etc. The inflator 6 is installed at a rear side of the rear protection area 4 in the rear of the vehicle.

The front protection area 3 has a main inflation cell or area or chamber 3-1 and a sub-inflation cell or area or chamber 3-2. These main inflation area 3-1 and sub-inflation area 3-2 are defined by a partition portion 8 formed by bonding or sewing the base fabrics. As can be seen in FIG. 1, the main inflation area 3-1 is located at an upper side and communicates with the gas introduction passage 7. The sub-inflation area 3-2 is located at a lower side of the main inflation area 3-1, namely that sub-inflation area 3-2 is located below the main inflation area 3-1.

The main inflation area 3-1 and the sub-inflation area 3-2 communicate with each other through a gas flow regulation (or restriction or control) passage 9 so as to regulate an internal pressure of the main inflation area 3-1 and/or the rear protection area 4. The gas flow regulation passage 9 is formed as a non-bonding portion (non-sewn or non-connected portion) of the base fabrics forming the air bag body 1 by dividing a part of the partition portion 8, and has a shape of an orifice.

The sub-inflation area 3-2 is substantially formed in an inverted "L" shape (or "L" shape) by extending one end side of the sub-inflation area 3-2 to a side of the main inflation area 3-1. In FIG. 1, a rear end side of the sub-inflation area 3-2 extends to the side of the main inflation area 3-1, and the sub-inflation area 3-2 has the inverted "L" shape.

With this structure and arrangement, the gas flow regulation passage 9 is not positioned at a narrow space between a center pillar 10 and a backrest portion (not shown). That is to say, since the sub-inflation area 3-2 is formed and located at the lower side of the main inflation area 3-1 in the front protection area 3, the gas flow regulation passage 9 through which the main and sub-inflation areas 3-1 and 3-2 communicate is also positioned at the lower side of the main inflation area 3-1, and thus the position of the gas flow regulation passage 9 deviates from the narrow space.

Accordingly, in a case where the internal pressure of the main inflation area 3-1 of the front protection area 3 or the rear protection area 4 increases due to a load caused by restraining the occupant and a part of an incoming gas in the main inflation area 3-1 or the rear protection area 4 attempts to flow into a side of the sub-inflation area 3-2 through the gas flow regulation passage 9, the gas flow into the sub-inflation area 3-2 can be smoothly achieved. Further, unlike the related art curtain air bag apparatus, a direction of the gas flow is substantially same as a direction of the deployment of the air bag body 1, thus the gas flow into the sub-inflation area 3-2 can be done more smoothly upon the inflation.

Hence, in this embodiment, when the internal pressure of the inflated main inflation area 3-1 or the inflated rear protection area 4 increases due to the load caused by restraining the occupants seated in both front and rear seats (not shown) in the vehicle, the sub-inflation area 3-2 effectively receives the part of the high pressure gas in the main inflation area 3-1 or the rear protection area 4 through the gas flow regulation passage 9. It therefore becomes possible to lower the pressures of the main inflation area 3-1 and the rear protection area 4 and to reduce an peak acceleration which the occupant suffers, and an occurrence of a rebound phenomenon can be avoided. Further, the main inflation area 3-1 and the rear protection area 4 can be prevented from excessively deflating, then a sufficient time for restraining the occupant can be secured. Unlike the related art curtain air bag apparatus, the sub-inflation area 3-2 in the present invention can function sufficiently.

In addition, since sub-inflation area 3-2 is substantially formed in the inverted "L" shape (or "L" shape) by extending its one end side to the side of the main inflation area 3-1, a capacity or volume of the sub-inflation area 3-2 becomes great, and then a pressure-regulatable quantity can be set to be large. Moreover, the sub-inflation area 3-2 is formed such that a part of the inverted "L" shape and the center pillar 10 face with each other, in other words, the part of the inverted "L" shape of the sub-inflation area 3-2 extends substantially along the center pillar 10. As a consequence, for example, particularly in a case of an air bag apparatus in which the internal pressure of the air bag body 1 becomes high by increasing an output of the inflator 6, the protection of the occupant is secured by the sub-inflation area 3-2 extending substantially along the center pillar 10.

However, according to the above structure and arrangement, when the main inflation area 3-1 inflates, since the partition portion 8 forming the sub-inflation area 3-2 is bonded or sewn as previously mentioned, the sub-inflation area 3-2 remains deflated or shrunken as shown in FIG. 2. In this embodiment, the gas flow regulation passage 9 is formed by dividing the partition portion 8, and a pair of divided end portions 8a and 8b are formed at an opening of the gas flow regulation passage 9. Since the divided end portions 8a and 8b face with each other on an extension line of the partition portion 8, there is a possibility that wrinkles or creases will occur on the line connecting the divided end portions 8a and 8b and this might narrow the gas flow regulation passage 9 (refer to FIG. 3).

Figure 5:
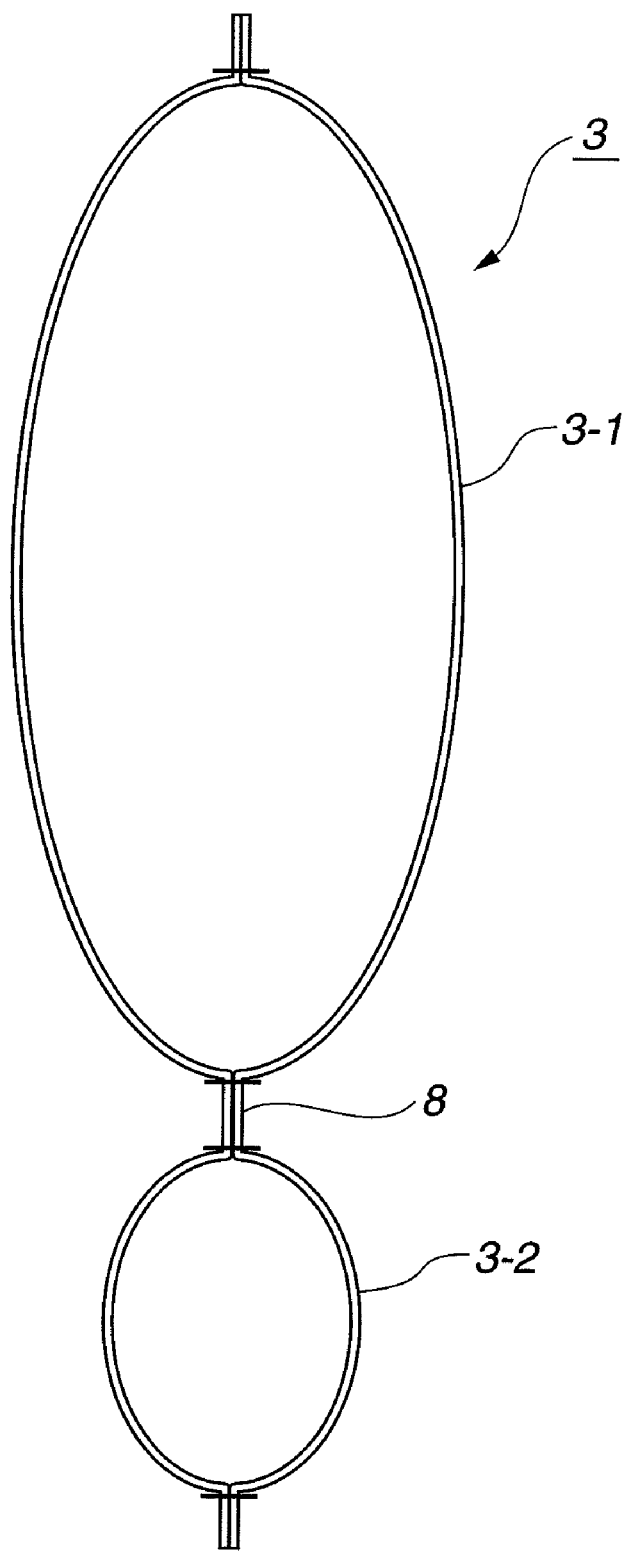
FIG. 5 is a sectional view taken along the plane C-C of FIG. 4.
Figure 6:
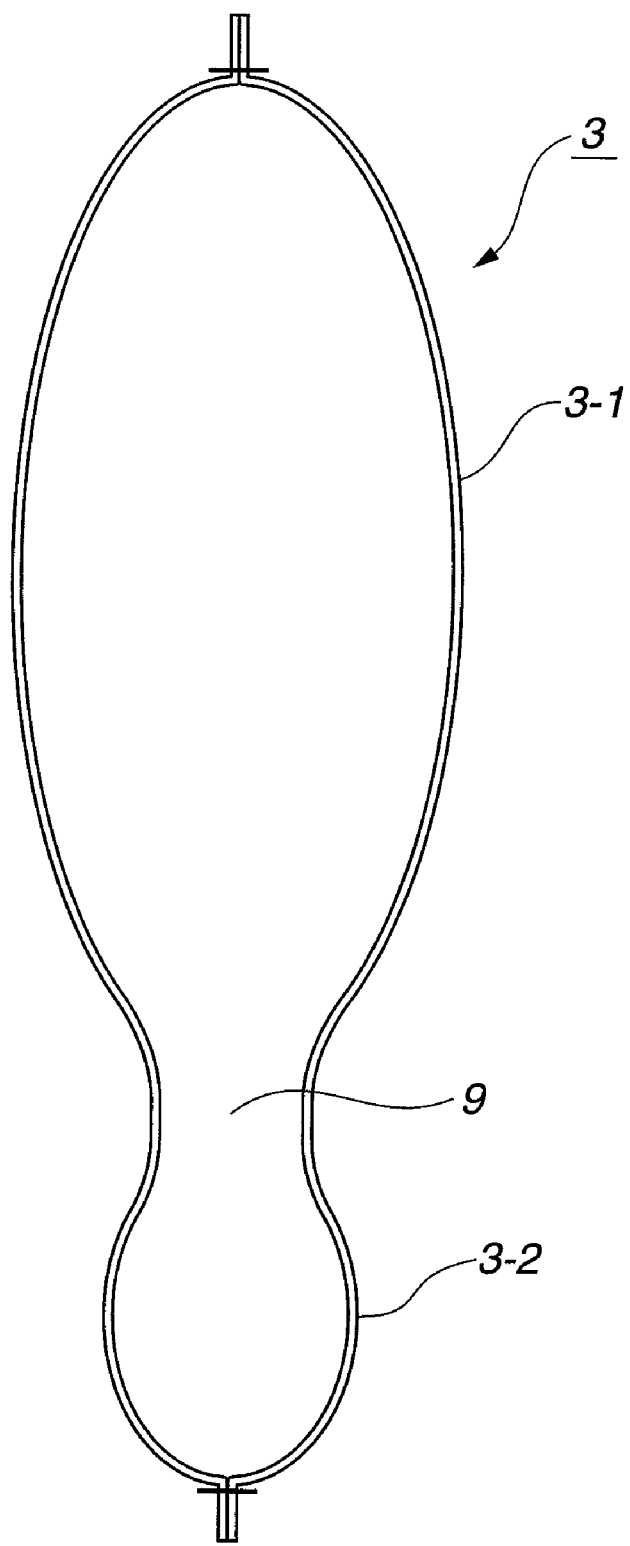
FIG. 6 is a sectional view taken along the plane D-D of FIG. 4.

In view of this point, a second embodiment was proposed and will be now explained with reference to FIGS. 4 to 6.

Figure 4:
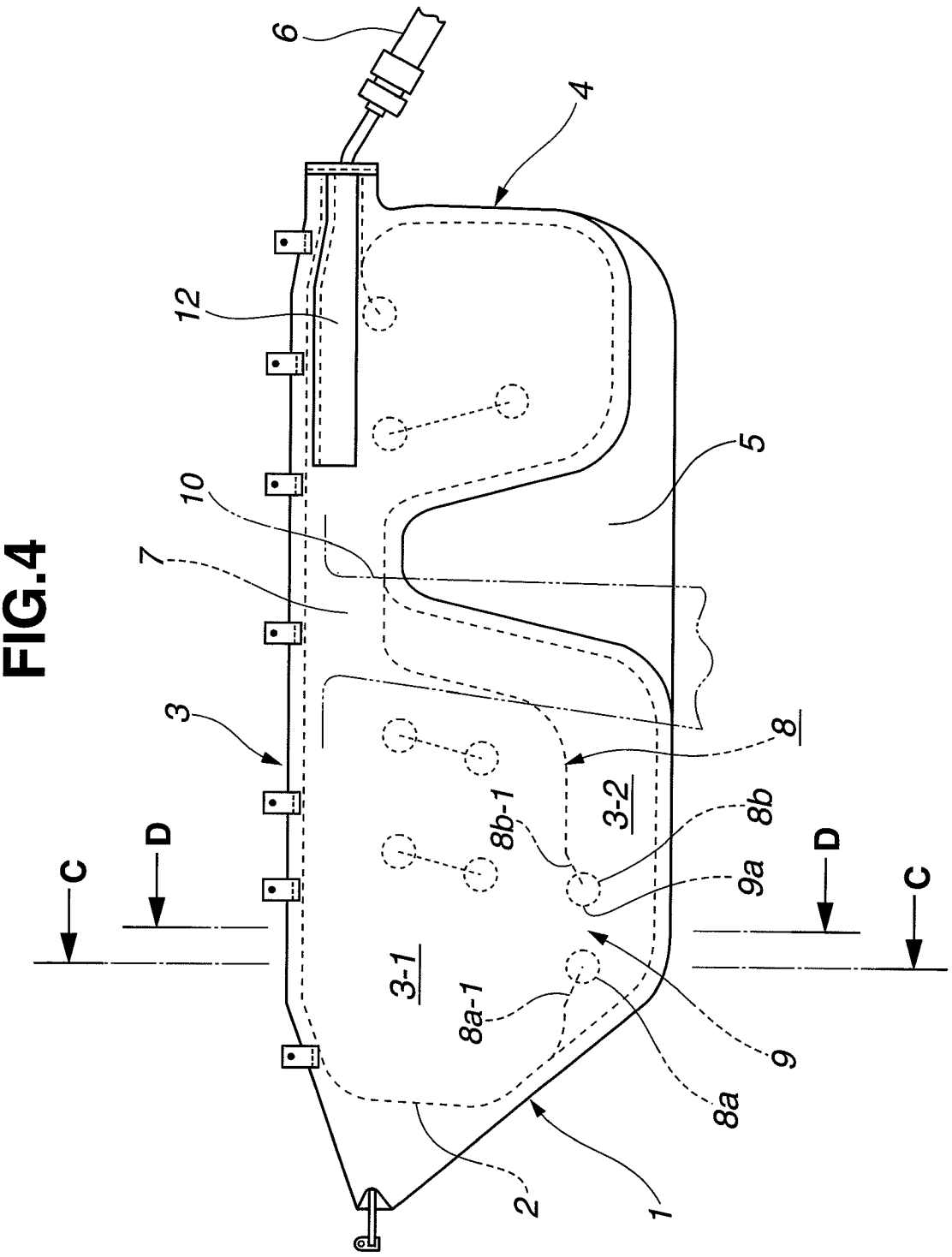
FIG. 4 is a side view showing an inflated and deployed state of a curtain air bag apparatus adopting a second embodiment of the present invention.

As can be seen in FIG. 4, the gas flow regulation passage 9 has an overhanging opening portion 9a which is formed by extending or shifting positions of the divided end portions 8a and 8b of the partition portion 8 toward the side of the sub-inflation area 3-2.

When the main inflation area 3-1 of the front protection area 3 is inflated by the incoming gas ejected from the inflator 6, the main inflation area 3-1 might be partly pulled and narrowed or shrunken and this may cause the occurrence of the crease on a line connecting each overhanging base end 8a-1, 8b-1 of the divided end portions 8a, 8b from the partition portion 8. However, in the second embodiment, the opening portion 9a of the gas flow regulation passage 9 has the overhanging shape by extending or shifting the divided end portions 8a and 8b of the partition portion 8 toward the side of the sub-inflation area 3-2. Consequently, even if the creases occur due to the narrowing or shrink upon the inflation of the main inflation area 3-1, since the opening portion 9a is formed at a position located below a portion of the crease occurrence, the opening portion 9a itself is not put in a narrowed state (the opening portion 9a itself does not narrow) (refer to FIG. 6). Therefore, the gas flow from the main inflation area 3-1 into the sub-inflation area 3-2 can be smoothly done, and the function as the sub-inflation area 3-2 can be sufficiently achieved at all times.

Figure 7:
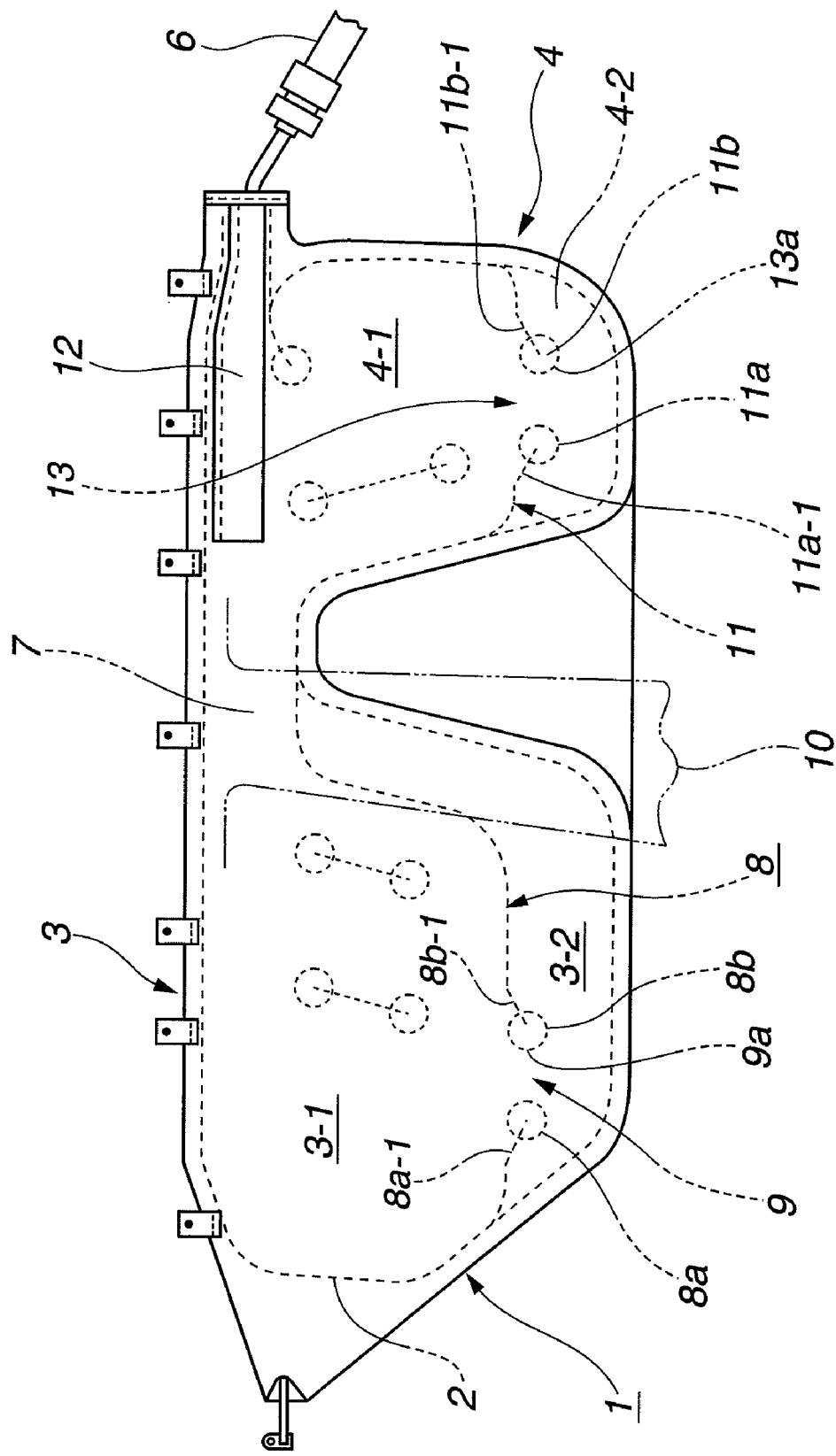
FIG. 7 is a side view showing an inflated and deployed state of a curtain air bag apparatus adopting a third embodiment of the present invention.
Figure 8:
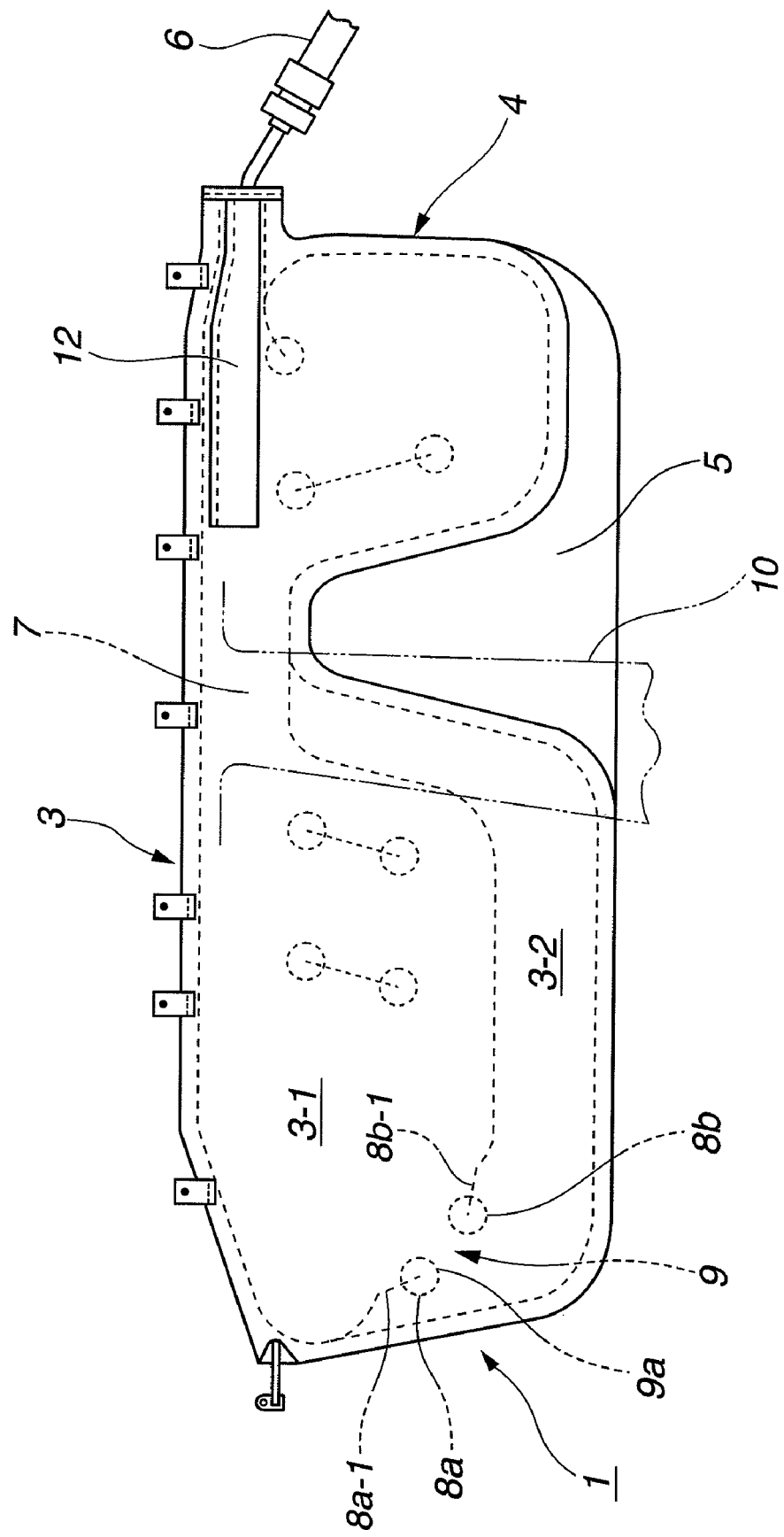
FIG. 8 is a side view showing an inflated and deployed state of a curtain air bag apparatus adopting a fourth embodiment of the present invention.
Figure 9:
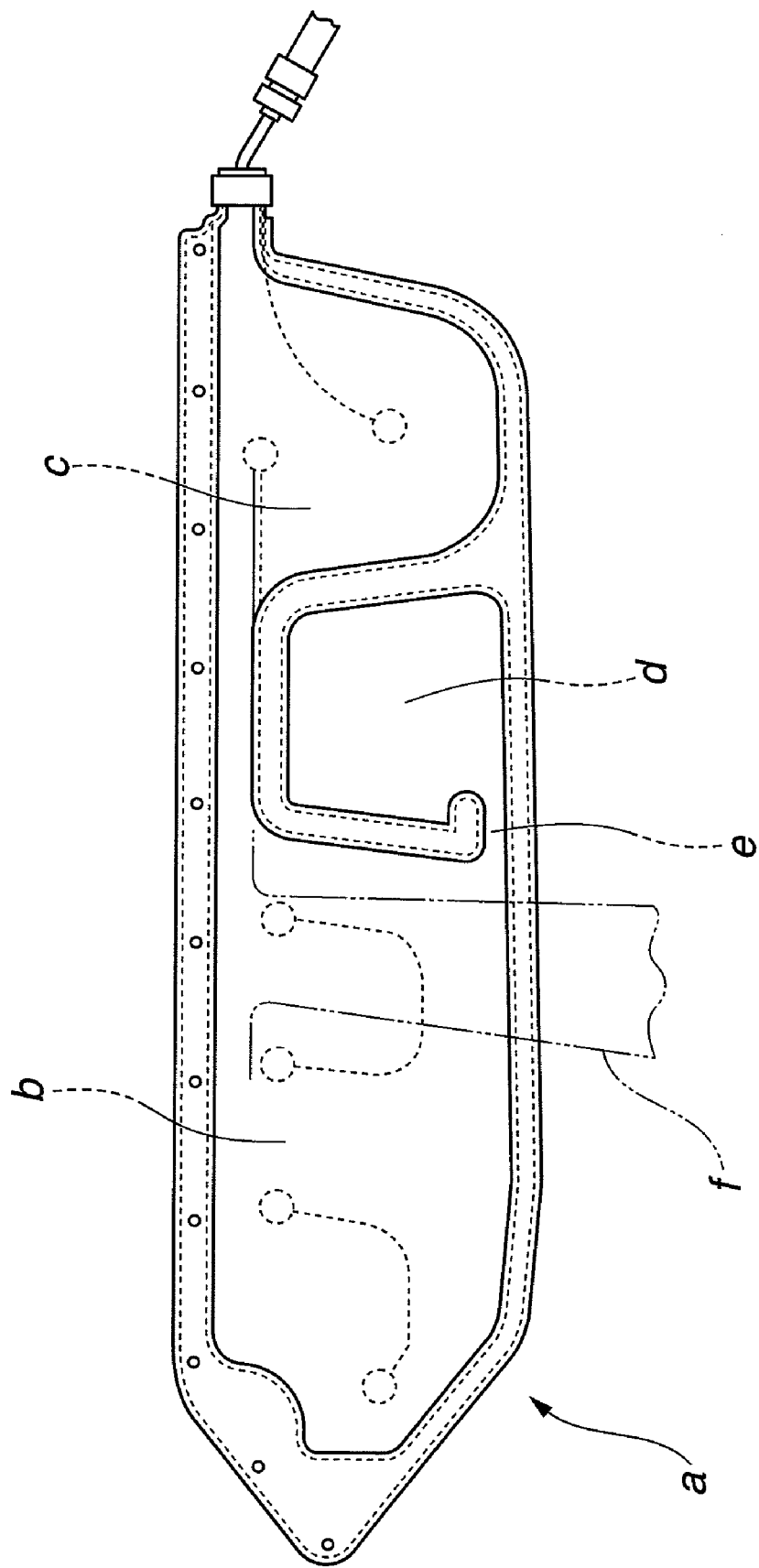
FIG. 9 is a side view showing an inflated and deployed state of a related art curtain air bag apparatus.

In FIGS. 7 and 8, third and fourth embodiments are respectively illustrated.

In the third embodiment shown in FIG. 7, in the same manner as the second embodiment, the sub-inflation area 3-2 is provided on a side of the front protection area 3. Further, a main inflation cell or area or chamber 4-1 and a sub-inflation cell or area or chamber 4-2 are provided on a side of the rear protection area 4 as well. As shown in FIG. 7, in the main inflation area 4-1, the gas introduction pipe 12 opens, and the high pressure gas ejected from the inflator 6 is introduced into the main inflation area 4-1. The sub-inflation area 4-2 is located at a lower side of the main inflation area 4-1, namely that sub-inflation area 4-2 is located below the main inflation area 4-1. The main inflation area 4-1 and the sub-inflation area 4-2 are defined by a partition portion 11 formed by bonding or sewing the base fabrics, but these main and sub-inflation areas 4-1 and 4-2 communicate with each other through a gas flow regulation (or restriction or control) passage 13.

An opening portion 13a of the gas flow regulation passage 13 has an overhanging shape by extending or shifting positions of divided end portions 11a and 11b of the partition portion 11 toward a side of the sub-inflation area 4-2.

With this structure, in the same manner as the second embodiment, the sub-inflation area 3-2 serves to regulate the internal pressure of the main inflation area 3-1 in the front protection area 3. In addition, the sub-inflation area 4-2 serves to regulate the internal pressure of the main inflation area 4-1 in the rear protection area 4.

In the third embodiment, the opening portion 9a of the gas flow regulation passage 9 has the overhanging shape by extending or shifting the divided end portions 8a and 8b of the partition portion 8 toward the side of the sub-inflation area 3-2, and also the opening portion 13a of the gas flow regulation passage 13 has the overhanging shape by extending or shifting the divided end portions 11a and 11b of the partition portion 11 toward the side of the sub-inflation area 4-2. As a result, when the main inflation area 3-1 of the front protection area 3 and the main inflation area 4-1 of the rear protection area 4 are inflated by the incoming gas ejected from the inflator 6, even if the main inflation areas 3-1 and 4-1 are partly pulled and narrowed or shrunken and then the creases occur on the line connecting each overhanging base end 8a-1, 8b-1 of the divided end portions 8a, 8b from the partition portion 8 and a line connecting each overhanging base end 11a-1, 11b-1 of the divided end portions 11a, 11b from the partition portion 11, since the opening portions 9a and 13a of the gas flow regulation passages 9 and 13 are formed at positions located below the portions of the crease occurrence respectively, the opening portion 9a, 13a themselves are not put in the narrowed state (the opening portion 9a, 13a themselves do not narrow). Therefore, the respective gas flow from the main inflation areas 3-1 and 4-1 into the sub-inflation areas 3-2 and 4-2 can be smoothly done, and the functions as the sub-inflation areas 3-2 and 4-2 can be sufficiently achieved at all times.

With regard to the fourth embodiment, it is a modified embodiment of the second embodiment. As shown in FIG. 8, the position of the gas flow regulation passage 9 formed at the partition portion 8 differs from that of the second embodiment. In the fourth embodiment, the gas flow regulation passage 9 is located at a front side of the vehicle. Other structure and arrangement except this point are the same as the second embodiment.

As explained above, in the present invention, the sub-inflation area is formed and located at the lower side of the main inflation area, thus the sub-inflation area can function sufficiently. Therefore, this is favorable for use of the curtain air bag apparatus adapted to protect the occupant by inflating and deploying the air bag body into the curtain-like shape in the side surface of the vehicle interior with the high pressure gas instantaneously provided and introduced into the air bag body by the inflator upon the vehicle collision.

This application is based on a prior Japanese Patent Application No. 2007-170946 filed on Jun. 28, 2007. The entire contents of this Japanese Patent Application No. 2007-170946 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A curtain air bag apparatus for protecting an occupant in a vehicle upon a vehicle collision, comprising:

an air bag body inflating and deploying in a curtain-like shape in a side surface of a vehicle interior with a high pressure gas jetted and introduced into the air bag body by an inflator, the air bag body comprising:

a main inflation chamber and a sub-inflation chamber defined by a partition portion formed in the air bag body, and respectively located at an upper side and a lower side of the air bag body; and a gas flow regulation passage which is formed at the partition portion, and through which the gas introduced into the main inflation chamber flows into the sub-inflation chamber in a substantially same direction as a direction of the deployment of the air bag body, which is from an upper side to a lower side of the air bag body.

2. The curtain air bag apparatus as claimed in claim 1, wherein:

the gas flow regulation passage has an overhanging opening portion formed by extending the opening portion toward the sub-inflation chamber.

3. The curtain air bag apparatus as claimed in claim 1, wherein:

the sub-inflation chamber is substantially formed in an L-shape or a mirror image of an L-shape by extending one end side of the sub-inflation chamber to a side of the main inflation chamber and extending an other end side of the sub-inflation chamber to a lower side of the main inflation chamber, so that the gas is introduced into the other end side of the sub-inflation chamber via the gas flow regulation passage at a lower side of the main inflation chamber.

4. The curtain air bag apparatus as claimed in claim 1, wherein:

the gas flow regulation passage is formed at a position that deviates from a center pillar of the vehicle.

5. The curtain air bag apparatus as claimed in claim 1, wherein:

the gas flow regulation passage is formed in a substantially same direction as a direction of the deployment of the air bag body.

6. The curtain air bag apparatus as claimed in claim 2, wherein:

the overhanging opening portion of the gas flow regulation passage is positioned at a front side of the vehicle in the air bag body.

7. The curtain air bag apparatus as claimed in claim 3, wherein:

the one end side of the sub-inflation chamber extends substantially along a center pillar of the vehicle so that the one end side overlaps with the center pillar.

* * * * *